United States Patent
Boateng

(10) Patent No.: US 9,689,310 B2
(45) Date of Patent: *Jun. 27, 2017

(54) AIRPLANE ENGINE BIRD STRIKE PROTECTION GUARD

(71) Applicant: William Boateng, Bronx, NY (US)

(72) Inventor: William Boateng, Bronx, NY (US)

(*) Notice: Subject to any disclaimer, the term of this patent is extended or adjusted under 35 U.S.C. 154(b) by 182 days.

This patent is subject to a terminal disclaimer.

(21) Appl. No.: 14/499,753

(22) Filed: Sep. 29, 2014

(65) Prior Publication Data
US 2015/0322858 A1     Nov. 12, 2015

Related U.S. Application Data

(60) Provisional application No. 61/989,320, filed on May 6, 2014.

(51) Int. Cl.
| | | |
|---|---|---|
| *B01D 39/00* | (2006.01) | |
| *F02C 7/055* | (2006.01) | |
| *F02C 7/052* | (2006.01) | |
| *F02C 7/05* | (2006.01) | |
| *B64D 33/02* | (2006.01) | |

(52) U.S. Cl.
CPC ............ *F02C 7/055* (2013.01); *F02C 7/05* (2013.01); *F02C 7/052* (2013.01); *B01D 2279/60* (2013.01); *B64D 33/02* (2013.01); *B64D 2033/022* (2013.01)

(58) Field of Classification Search
CPC ... B64D 33/02; B64D 2033/022; F02C 7/055; F02C 7/052; F02C 7/05; B01D 2279/60
See application file for complete search history.

(56) References Cited

U.S. PATENT DOCUMENTS

| | | |
|---|---|---|
| 2,534,138 A | 12/1950 | Marshall |
| 2,623,610 A | 12/1952 | Buechel |
| 2,709,499 A | 5/1955 | Bell et al. |
| 2,764,390 A | 9/1956 | Harris, Jr. |
| 2,835,342 A | 5/1958 | Hockert |
| 2,928,497 A | 3/1960 | Stockdale |
| 2,931,460 A | 4/1960 | McEachern |
| 2,969,941 A | 1/1961 | Hobart |

(Continued)

FOREIGN PATENT DOCUMENTS

DE     10122305 A1     11/2002

OTHER PUBLICATIONS

International Search Report for PCT/US2016/041278 dated Oct. 7, 2016.

*Primary Examiner* — Dung H Bui
(74) *Attorney, Agent, or Firm* — Brown & Michaels, PC

(57) ABSTRACT

An aircraft engine guard, for protecting an aircraft engine against ingestion of large objects, includes a generally cone-shaped body, a base section of the rear end of the guard body and a dome section at the distal forward end of the guard body, at least three, vertical, peripherally extending walls located between the base and the dome section, with successive ones of the peripheral walls having different peripheral dimensions, peripherally cylindrical, with the dimension increasing from the base toward the dome section. A plurality of air intake openings are defined in and between the peripheral walls with at least one dimensional size which is small enough to prevent having birds from being able to pass through the guard into the aircraft engine.

5 Claims, 12 Drawing Sheets

(56) References Cited

U.S. PATENT DOCUMENTS

| | | | | |
|---|---|---|---|---|
| 3,196,598 | A | * | 7/1965 | Olson .................... B64D 33/02 |
| | | | | 415/121.2 |
| 3,449,891 | A | * | 6/1969 | Amelio ................. B64D 33/02 |
| | | | | 244/53 B |
| 3,483,676 | A | * | 12/1969 | Sargisson ............... B64D 33/02 |
| | | | | 55/306 |
| 6,994,738 | B2 | | 2/2006 | Taddey et al. |
| 7,803,204 | B1 | | 9/2010 | Mladinich |
| 2005/0229558 | A1 | | 10/2005 | Stelzer et al. |
| 2008/0173276 | A1 | | 7/2008 | Barnard et al. |
| 2010/0284791 | A1 | | 11/2010 | Flores |
| 2010/0287908 | A1 | | 11/2010 | Cunningham |
| 2012/0042958 | A1 | | 2/2012 | Brown |
| 2012/0125009 | A1 | | 5/2012 | Jones et al. |

* cited by examiner

AIRPLANE ENGINE BIRD STRIKE PROTECTION GUARD

CROSS-REFERENCE TO RELATED APPLICATION

This application claims benefit of and priority to Provisional Patent Ser. No. 61/989,320 filed May 6, 2014, the contents of which are incorporated herein by reference.

BACKGROUND OF THE INVENTION

The present invention is generally directed to airplane engines and, more particularly, to airplane engine guards that provide protection against bird strikes and ingestion, for use on turbine engines, such as aircraft engines and the like.

The prior art is generally aware of the great risk to airplanes which ensues from the ingestion of foreign objects into the air inlet of jet engines, as reflected by the descriptions in prior art documents, including in U.S. published patent applications: US 2009/0101760; US 2010/0180566; US 2010/0287908; US 2011/0000184; US 2011/0011055; US 2011/0030333; US2011/0095912; US 2013/0213003; US 2013/0291726; and US 2013/0294894, the entire contents of said published patent applications being incorporated by reference herein.

The problem tackled by the present disclosure is particularly acute with jet engines used by aircraft, since such engines are operated in an environment where foreign objects cannot be removed or controlled. The engines of jet aircraft taxiing on the ground frequently ingest foreign objects such as tools and other small metal objects, while a jet aircraft in flight is susceptible to ingestions of birds, leaves, paper and other airborne debris.

The ingestion of almost any solid foreign object into the air inlet of a jet engine causes damage to the compressor stages, and possibly to other portions of the engine. This engine damage is immediately manifested by a partial or complete loss of available engine thrust, with consequent impairment of aircraft flying ability.

The problem of bird ingestion into jet engines is particularly acute during aircraft take-off, where an aircraft may fly through a flock of birds at precisely the time when maximum available thrust is required for a safe take-off. Since many commercial and private jet-powered aircraft have only two engines, it will be appreciated that a partial loss of power in both engines, or a total loss of power in one engine, occurring during or shortly after take-off can have drastic consequences. Post-crash investigations have proved that numerous jet aircraft crashes, resulting in loss of life and extensive property damage, are directly attributable to bird ingestion which occurred during or shortly after take-off.

According to FAA statistics, there have been over 100,000 (Civil and USAF) wildlife strikes between 1990 and 2008, and the number of strikes has climbed steadily since 1990. In 1990, the industry saw 1,738 bird strikes; in 2007, the number had increased to 7,666. Some of that trend is due to increased air travel, but the frequency of wildlife strikes has tripled from 0.527 to 1.751 per 10,000 flights.

Bird strikes, particularly of the jet's engines, can have catastrophic consequences. On Oct. 4, 1960, Eastern Air Lines Flight 375 was struck by a flock of European starlings during take-off. All four engines were damaged and the aircraft crashed in the Boston harbor. There were 62 fatalities.

Although FAA regulations require that jet engines be designed to permit continued operation after ingesting a bird of specified size at a specified aircraft speed, such design has not eliminated bird strikes causing engine damage and/or failure. On Jan. 15, 2009, a double bird strike involving Canadian geese impacted U.S. Airways Flight 1549, an Airbus A320-214, about three minutes after take-off from La Guardia airport, when the airplane was at an altitude of 2,818 feet AGL (above ground level). The bird strike resulted in an immediate and complete loss of thrust to both engines, forcing the crew to ditch the plane in the Hudson River.

FAA statistics report that 92% of bird strikes occur at or below 3,000 feet AGL, thus at a critical point of takeoff or landing. Proposed ground-based wildlife abatement programs, such as radar detection of bird flocks and use of lights, noise makers, and water cannons are of little to no use in abating bird strikes at altitudes such as Flight 1549 experienced, or higher altitudes.

The increase in bird strikes has resulted in regular reports of commercial jets being forced to make emergency landings shortly after takeoff. According to FAA statistics, gulls are the most common type of bird to strike aircraft, accounting for 19% of the birds identified in bird strikes. Doves and pigeons are the second most common, accounting for 15% of the birds identified in bird strikes. But as Flight 1549 proves, bird strikes of larger birds such as Canadian geese can also occur, with devastating consequences.

There are many factors contributing to increasing rates of bird strikes by commercial and military aircraft. These factors include: 1) As jet travel replaced the noisier and slower piston-powered aircraft, the chance of these jets colliding with wildlife increased; 2) Along with the change in mode of travel there has been an increase in air traffic worldwide, both military and commercial; 3) Natural habitat surrounds many modern airports and this habitat provides shelter, nesting area, and feeding areas for wildlife that is not usually present in the surrounding metropolitan area; 4) Many of the world's busiest airports, including Washington Reagan National, Philadelphia International, New York La Guardia, and Boston Logan International, are near large bodies of water that create the aforementioned natural habitats for large water fowl such as geese and ducks; and 5) Wildlife conservation measures generally serve to increase the populations of native birds. These factors result in a majority of wildlife strikes occurring within the immediate airport environment. According to FAA statistics, over $600 million dollars annually is lost due to wildlife strikes with civil aircraft in the United States alone.

The term "jet engine" as used herein is intended to include various types of engines which take in air at a relatively low velocity, heat the air through combustion, and expel the air at a much higher velocity. The term "jet engine" includes turbojet engines and turbofan engines, for example.

A jet engine conventionally comprises a compressor section for compression of the intake air, a combustion section for combustion of the compressed air and a turbine section arranged behind the combustion chamber, the turbine section being rotationally connected to the compressor section in order to drive this by means of the energy-rich gas from the combustion chamber. The compressor section usually comprises a low-pressure compressor and a high-pressure compressor. The turbine section usually comprises a low-pressure turbine and a high-pressure turbine. The high-pressure compressor is rotationally locked to the high-pressure turbine via a first shaft and the low-pressure compressor is rotationally locked to the low-pressure turbine via a second shaft.

In the aircraft jet engine, stationary guide vane assemblies are used to turn the flow from one angle to another. The stationary guide vane assembly may be applied in a stator component of a turbo-fan engine at a fan outlet, in a Turbine Exhaust Case (TEC) and in an Inter-Mediate Case (IMC).

Although, as noted above, the prior art has addressed itself to the problem, the instant inventor has evolved solutions that overcome various drawbacks and shortcomings of the prior art, including providing designs that are more sturdy, highly functional, versatile, and also aesthetically and aerodynamically more advantageous for use.

SUMMARY OF THE INVENTION

Accordingly, it is an object of the present invention to provide an engine guard that does not interfere with the air intake needs of the aircraft engines.

It is another object of the present invention to provide aircraft engine guards that are aerodynamic and very sturdy.

It is another object of the invention to provide engine guards that can be easily connected to existing aircraft engine housings.

The foregoing and other objects of the invention are realized with airplane engine guards that have a general cone shape appearance with graduated, distinct diametrical sections that are staggered one in front of the other to provide a maximum airflow and optimal protection against bird strikes.

In accordance with the preferred embodiments, the invention is directed to an aircraft engine guard, for protecting an aircraft engine against ingestion of large objects, the guard comprising: a generally cone-shaped body; a base section at a rear end of the guard body and a dome section at a distal forward end of the guard body; at least three vertical, peripherally extending walls located between the base and the dome section, successive ones of the peripheral walls having different peripheral dimensions, said dimensions decreasing from the base toward the dome section; and a plurality of air intake openings with said air intake openings having at least one dimensional size measuring less than a predetermined number of centimeters. Preferably, the intake openings include a plurality of side facing intake openings located in at least one of the peripheral walls. The intake openings may include a plurality of forward facing intake openings in combination with the former openings. Tabs may be included to connect the vertical, peripheral walls to each other and the forward facing intake openings being partially defined between the tabs. The air intake openings may include openings that extend continuously over two adjacent peripheral walls.

Other features and advantages of the present invention will become apparent from the following description of the invention which refers to the accompanying drawings.

BRIEF DESCRIPTION OF THE DRAWING(S)

DETAILED DESCRIPTION OF EMBODIMENTS OF THE INVENTION

With reference to the drawings, the invention is generally directed to jet engine guards that share the feature that they have a base which matches the shape of the engine forward housing contour and is easily attached to the existing engines. Another common feature of the airplane engine guards of the present invention is that they are generally cone-shaped with successively smaller diameter sections, where each section may have a constant diameter, or a tapered diameter or a slightly outwardly bulging region.

Another common feature of the airplane engine guards of the present invention is that their housing walls comprise large perforations that extend around the wall peripheries, where each embodiment differs by the number of wall sections, wall angles and number and orientation of openings or holes thereat.

Another common feature resides in the provision of a leading structure that has a cone shape with a forward hat that bears the brunt of the task of meeting and deflecting birds away from the engine openings. The leading hat forward component of the guards may be flat, tapered or ridged.

Figure 1:
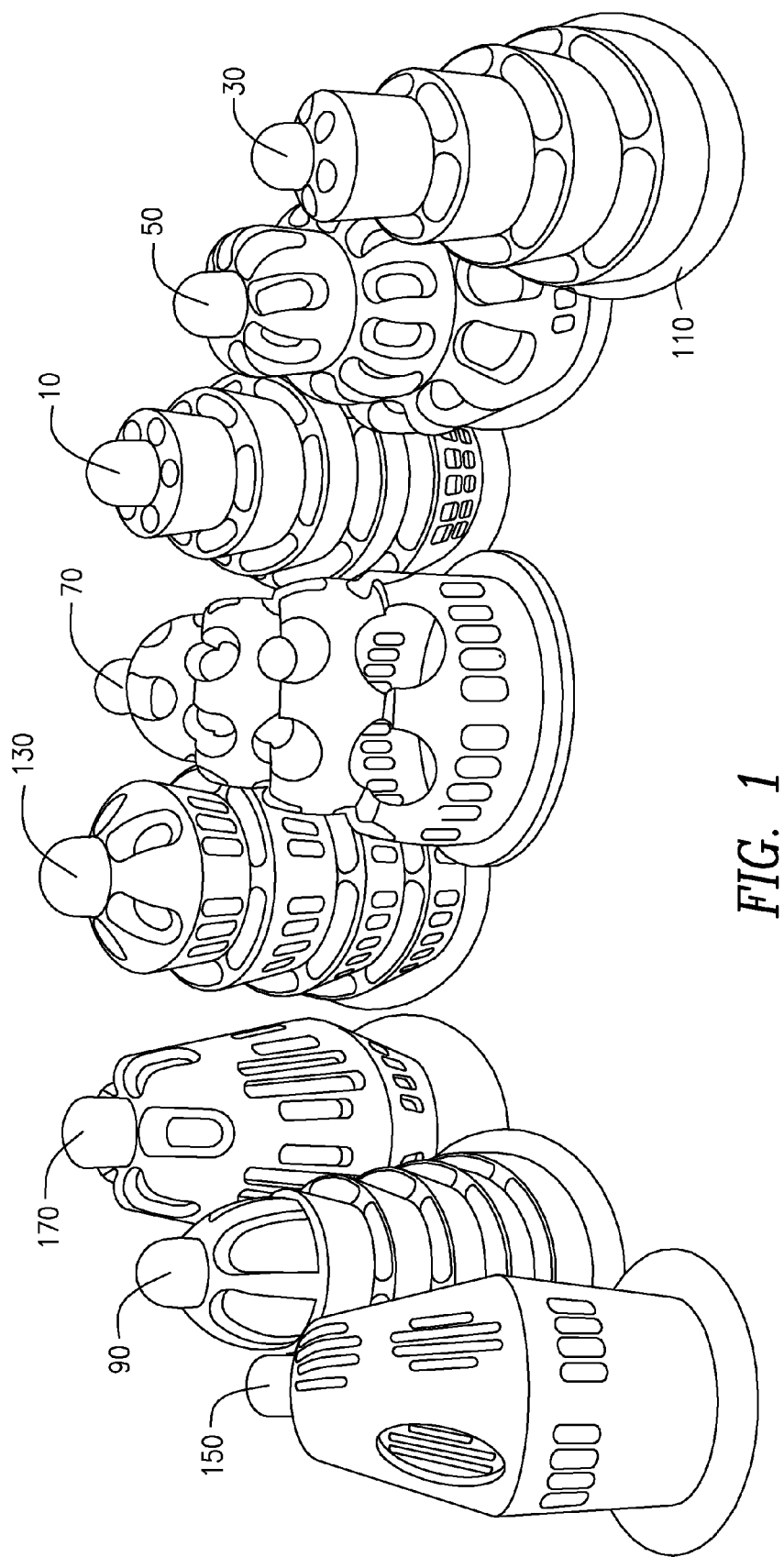
FIG. 1 is a perspective showing eight different protective guards of the present invention.

The perspective of FIG. 1 shows eight different airplane guard designs, including a first guard 150, a second guard 90, a third guard 170, a fourth guard 130, a fifth guard 10, a sixth guard 50, a seventh guard 110 or 30 and an eight guard 70.

In general, the guards are made of metal, preferably aluminum that is half an inch thick, but could be as much as an inch thick or even greater, as necessary to have the needed strength and rigidity to absorb forces exceeding well beyond 50,000 foot-pounds impacts. In general, the guards have a general cone shape with a base flange for attaching to the intake side of an airplane engine, and an outer wall made of several sections and various openings and slots for air intake.

Figure 2:
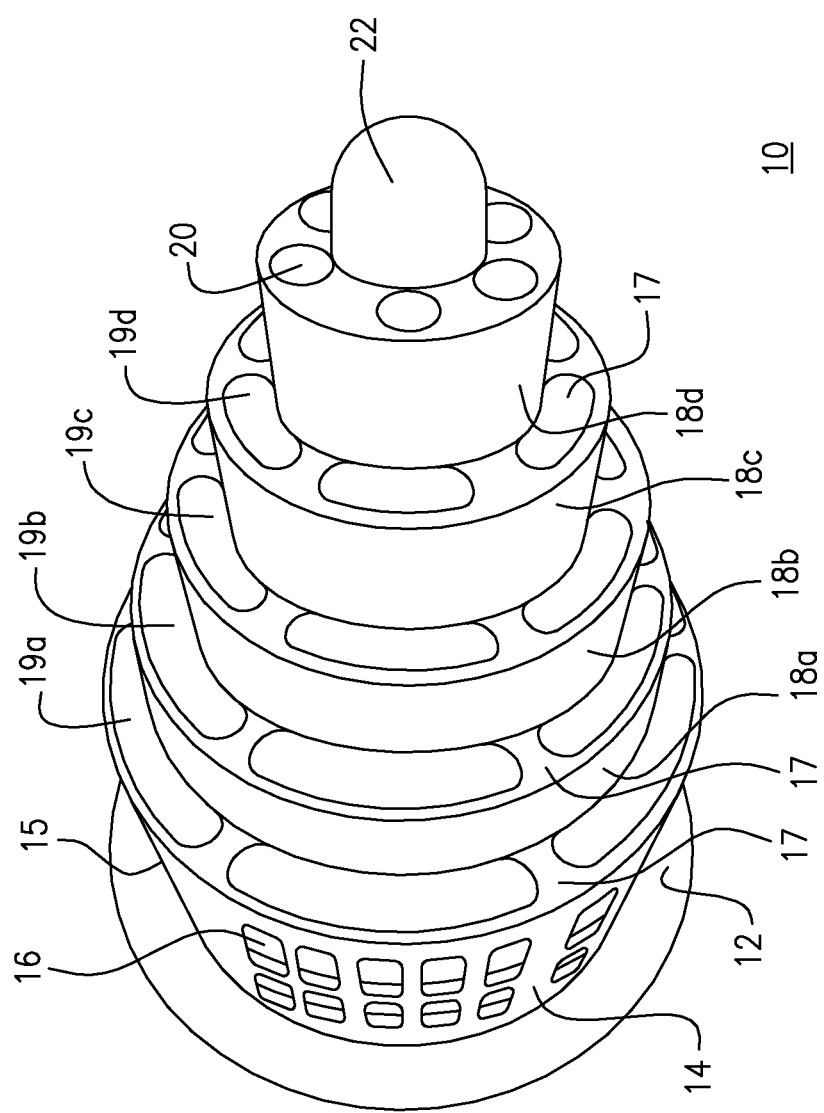
FIG. 2 is a perspective of an air engine protective guard in accordance with the first embodiment of the invention.

More specifically, the first embodiment of FIG. 2 shows a guard 10, with a base flange 12, with screw/rivet openings 13 (FIG. 3) for being mounted to the aircraft engine. The openings 13 can be disposed every inch or so around the periphery to provide a strong hold of the guard 10 to the engine (not shown). The guard 10 has a first vertical, base peripheral side wall 14, with a plurality of side-facing air intakes holes 16 arranged in two circular lines around the periphery, in sections with each section having ten holes, five on top and the other five below.

Figure 3:
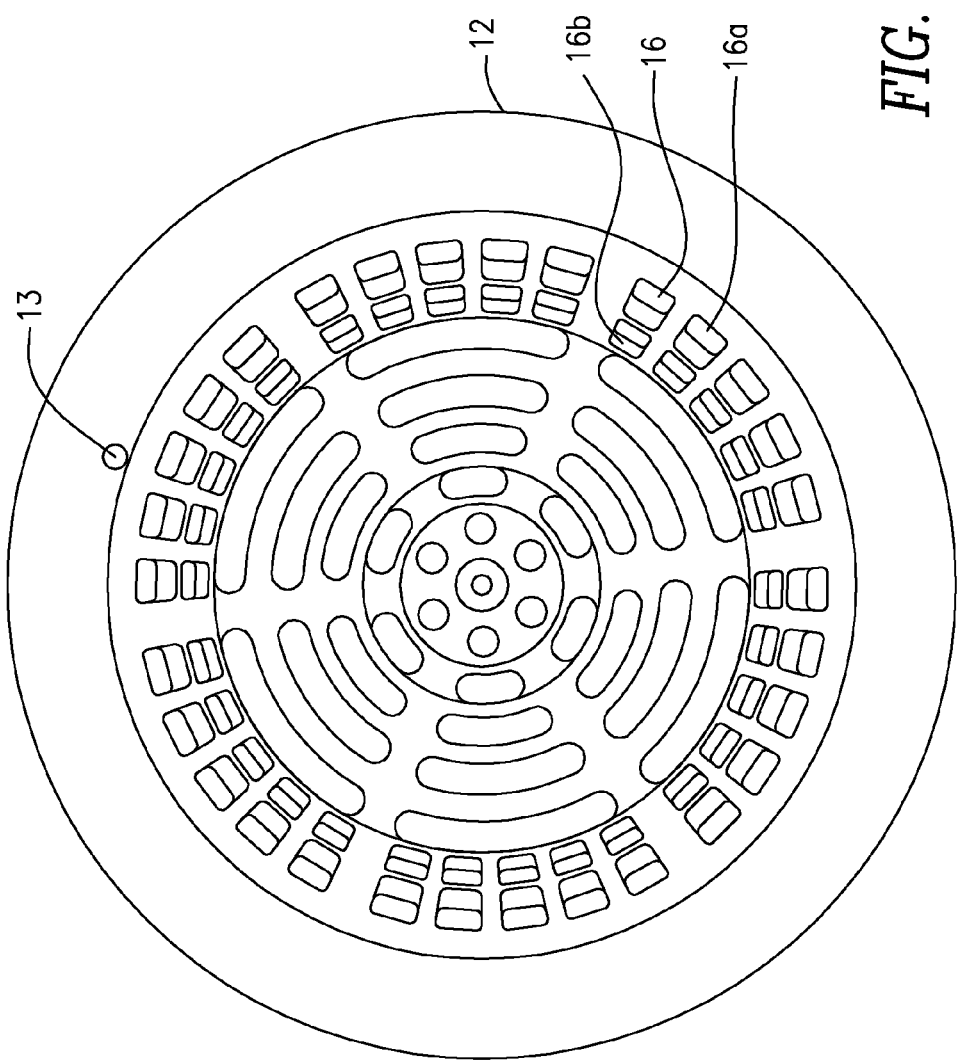
FIG. 3 is a rear plan view of FIG. 2.

In addition, there are also vertical walls 18a, 18b and 18c, each one having a smaller diameter than the other, and joined to each other by connecting tabs 17, as shown. The spaces between the tabs and walls define arcuate horizontal but forward facing slots 19a, 19b, 19c and 19d. The wall 18d defines the dome of the guard, with a dome hat 22 and a plurality of forward facing holes 20. The guard 10, when mounted to an engine plane, assures that no bird component that weighs more than 3 pounds can get into the engine, it being understood that the Federal Aviation Administration (FAA) has a set specification that requires a jet engine to be able to absorb animal/fowl components of less than or about four pounds. FIG. 3 shows a rear view of the embodiment of FIG. 2.

Figure 4:
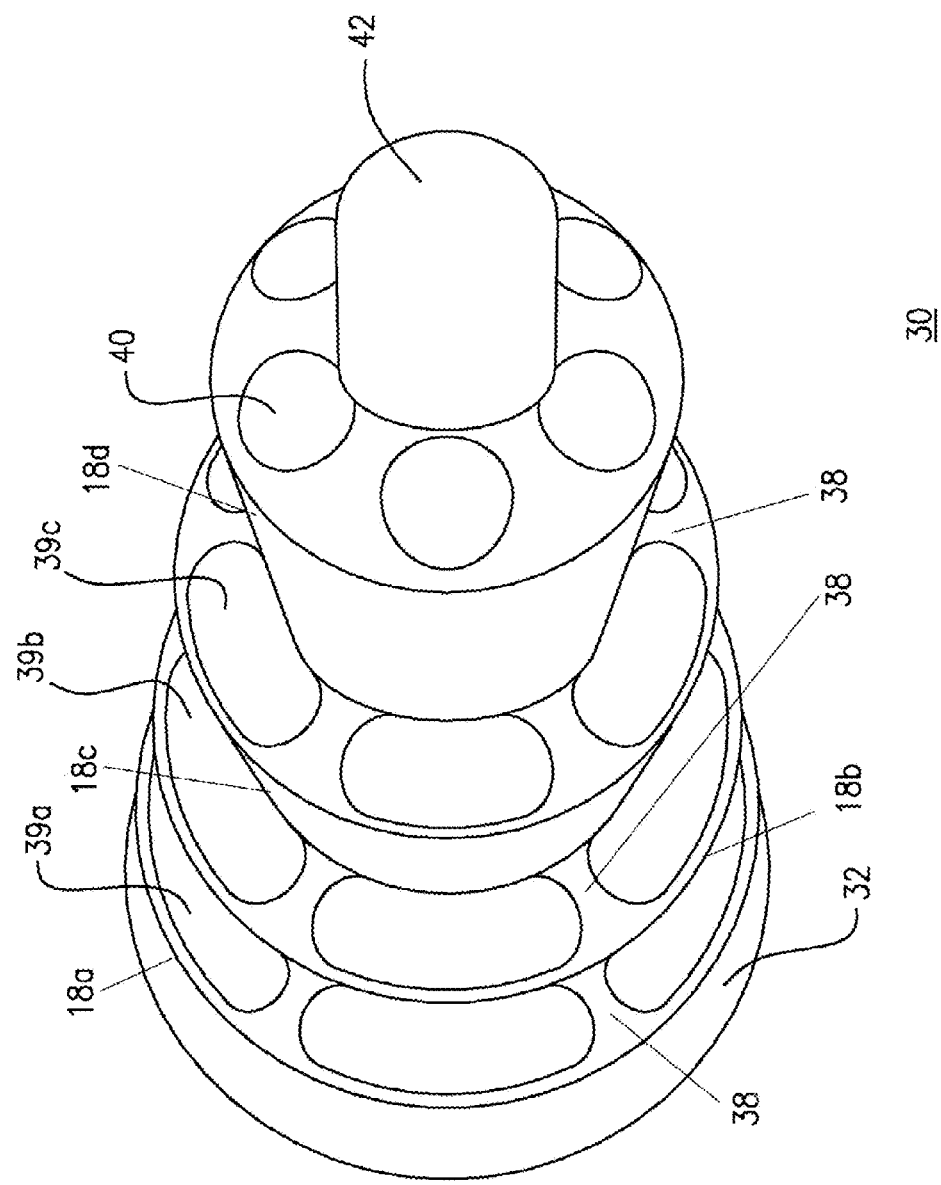
FIG. 4 is a perspective of air engine guard in accordance with the second embodiment of the invention.
Figure 5:
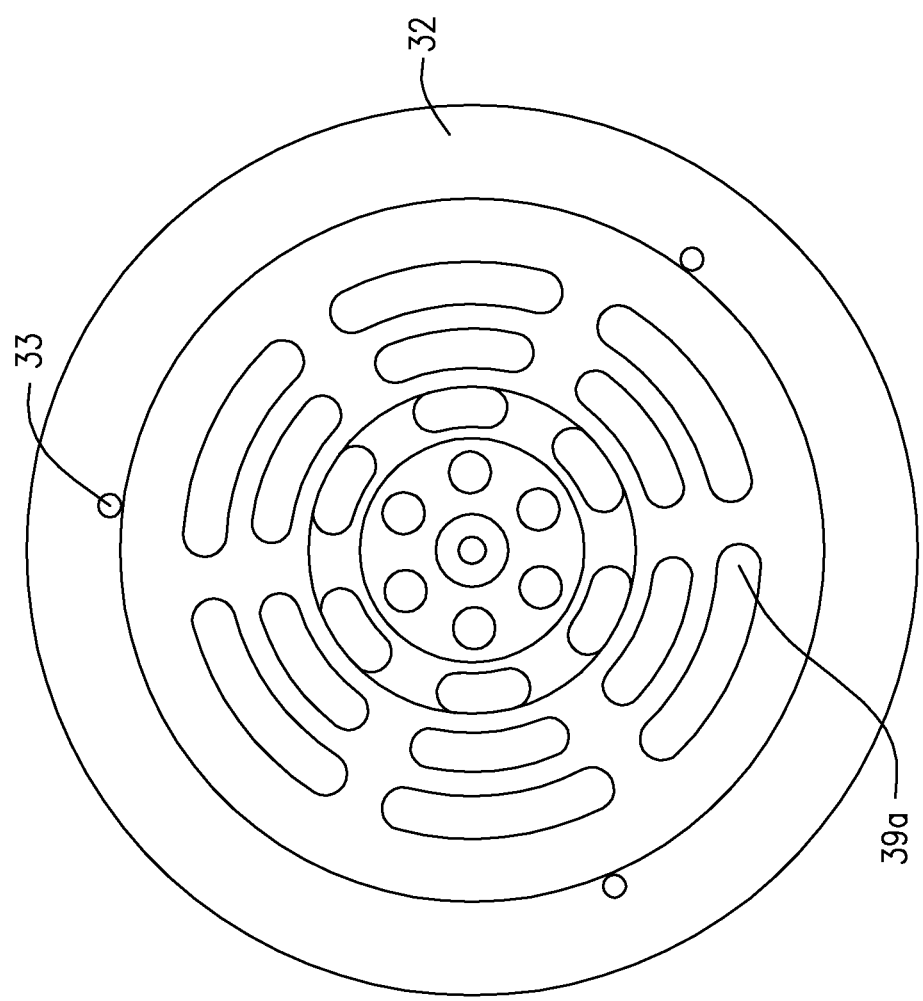
FIG. 5 is a rear view of FIG. 4.

In a further embodiment (FIG. 4), the guard 30 has a similar base 32, an outer wall made up of vertical walls 18a, 18b and 18c, each one having a smaller diameter than the other, and joined to each other by connecting tabs 38, with successive forwardly facing arcuate and horizontal air intake openings 39a, 39b, 39c, a dome section 18d with forward facing openings 40, and a dome hat 42. FIG. 5 is rear view of FIG. 4, showing the screw openings 33 previously mentioned.

Figure 6:
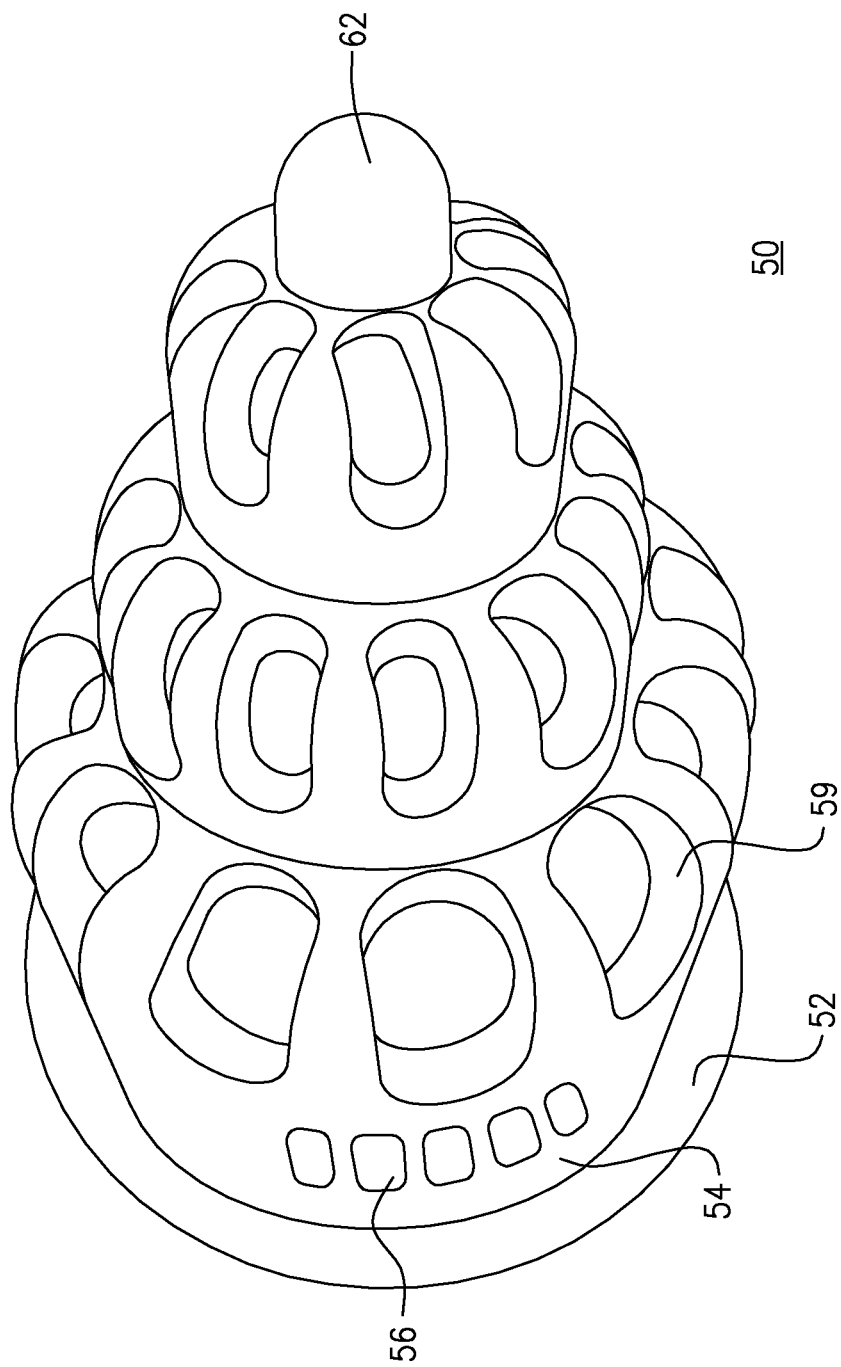
FIG. 6 is a perspective of a third embodiment of an air engine guard.

In a further embodiment (FIG. 6), the guard 50 has a similar base plate 52, a plurality of progressively smaller diameter walls that, in this case are curved and have vertically extending and curved arcuate holes 59a, at each level, as shown, terminating in the dome hat 62. The base peripheral wall 54 has one row of intake side-facing holes 56, similar to the holes 16 of FIG. 2.

Figure 7:
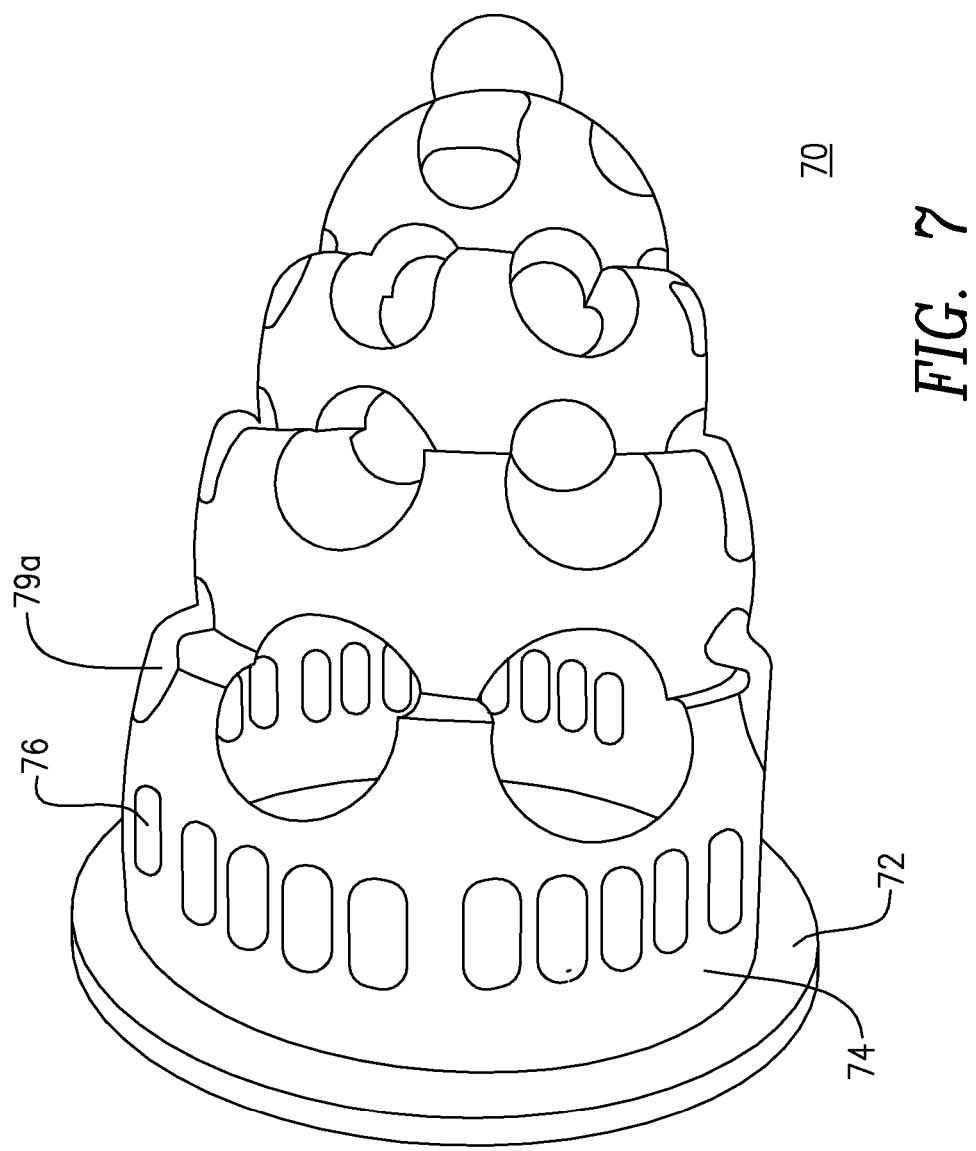
FIG. 7 is a perspective of a fourth embodiment of an air engine guard.

In the further embodiment of FIG. 7, the guard 70 has a base 72, a plurality of vertically oriented generally rectangular and side facing, intake holes 72 that are arranged around the periphery and a plurality of vertical walls with vertically oriented, curved holes 79a that face partially forwardly, as shown.

Figure 8:
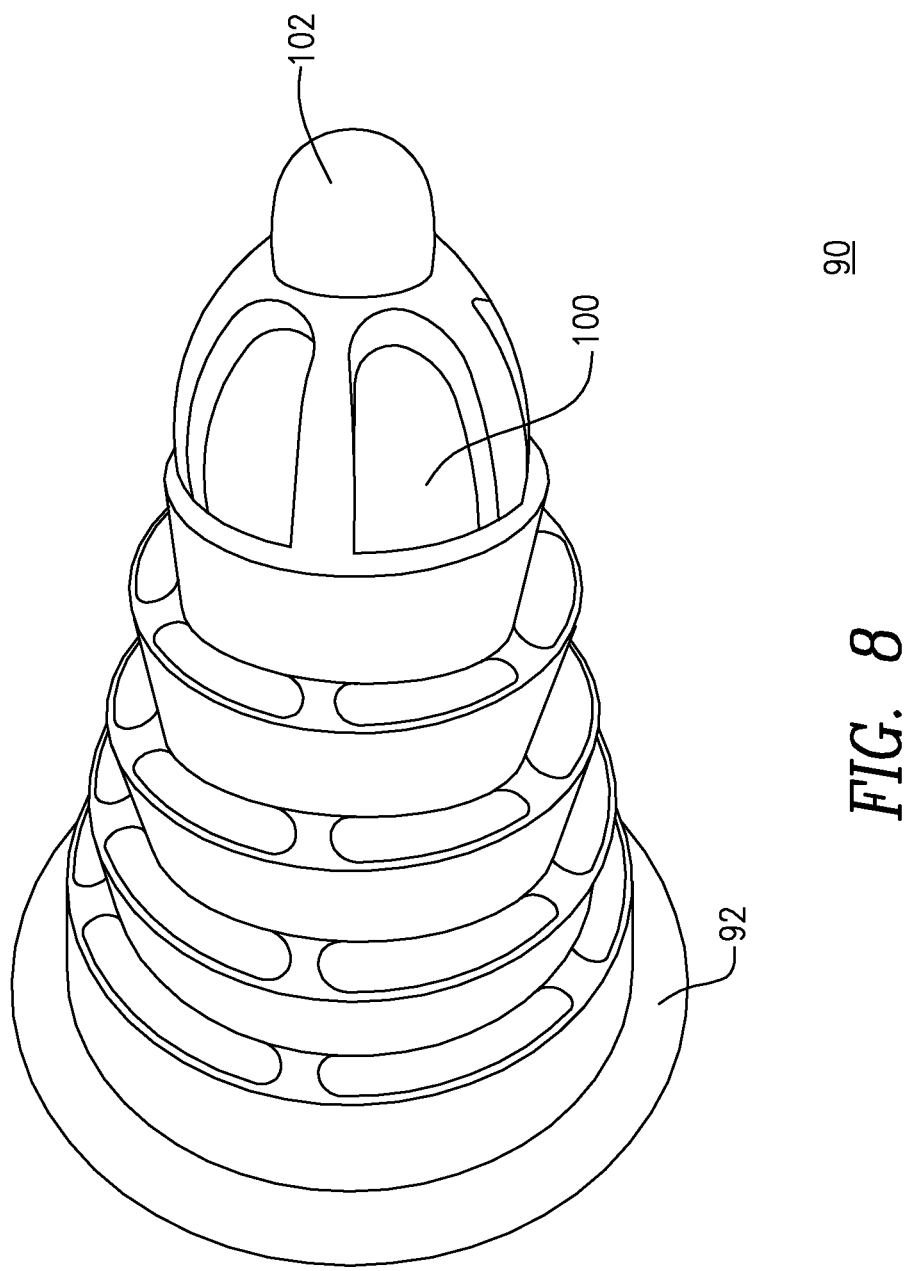
FIG. 8 is a perspective of a fifth embodiment of an air engine guard.

With reference to FIG. 8, the guard 90 of this embodiment has vertically oriented and curved intake holes 100 in its dome, that are located directly below the dome hat 102, with four vertical walls joined by tabs as before, that define arcuate, horizontally disposed and forwardly oriented air intake openings, as shown.

Figure 9:
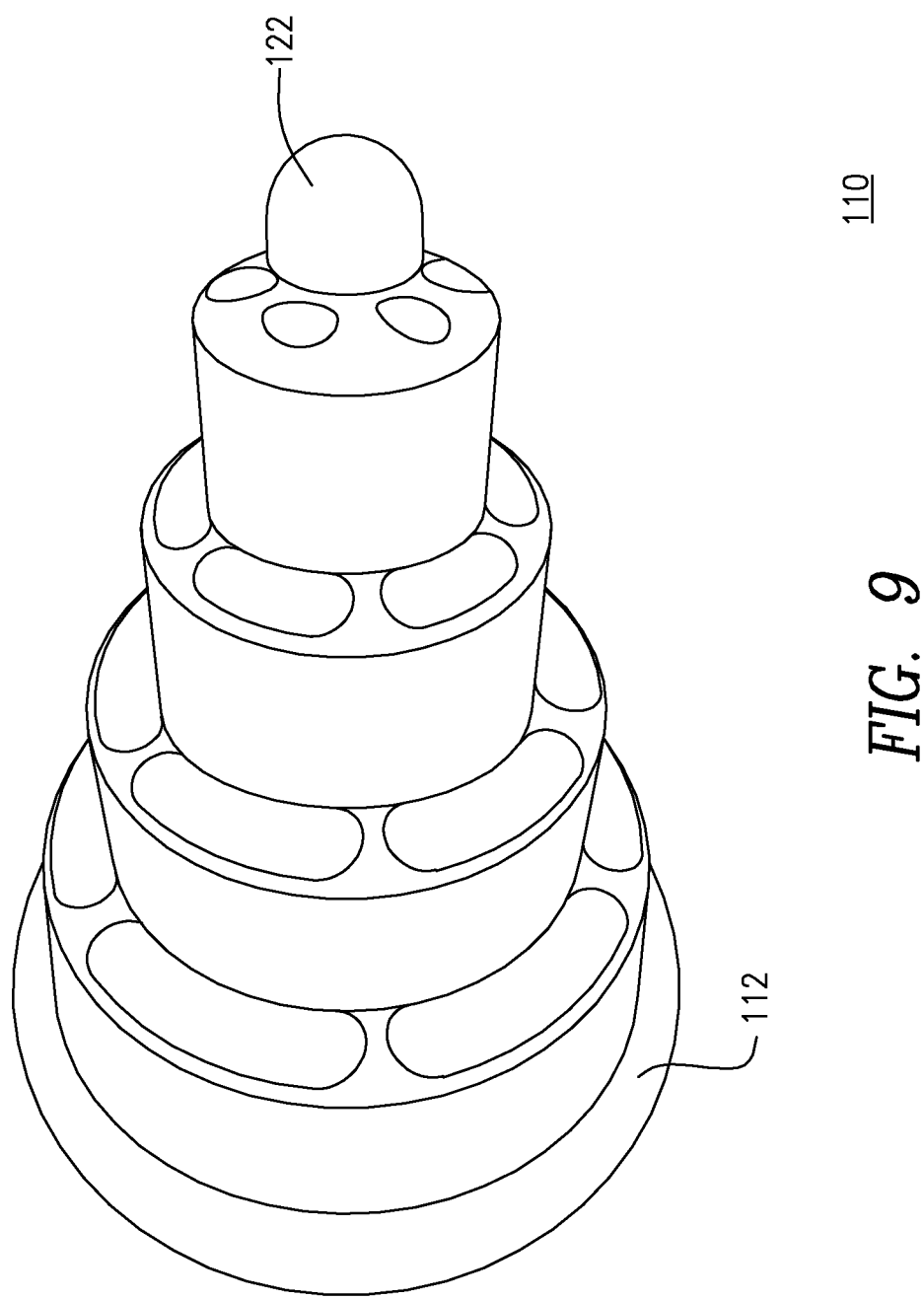
FIG. 9 is a perspective of a sixth embodiment of an air engine guard.

In FIG. 9, the guard 110 has a base 112, three vertical walls with arcuate and forwardly facing air intakes therebetween, as well as a dome culminating in a dome hat 122 and a plurality of forwardly facing round air intake holes at the base of the dome hat, as shown.

Figure 10:
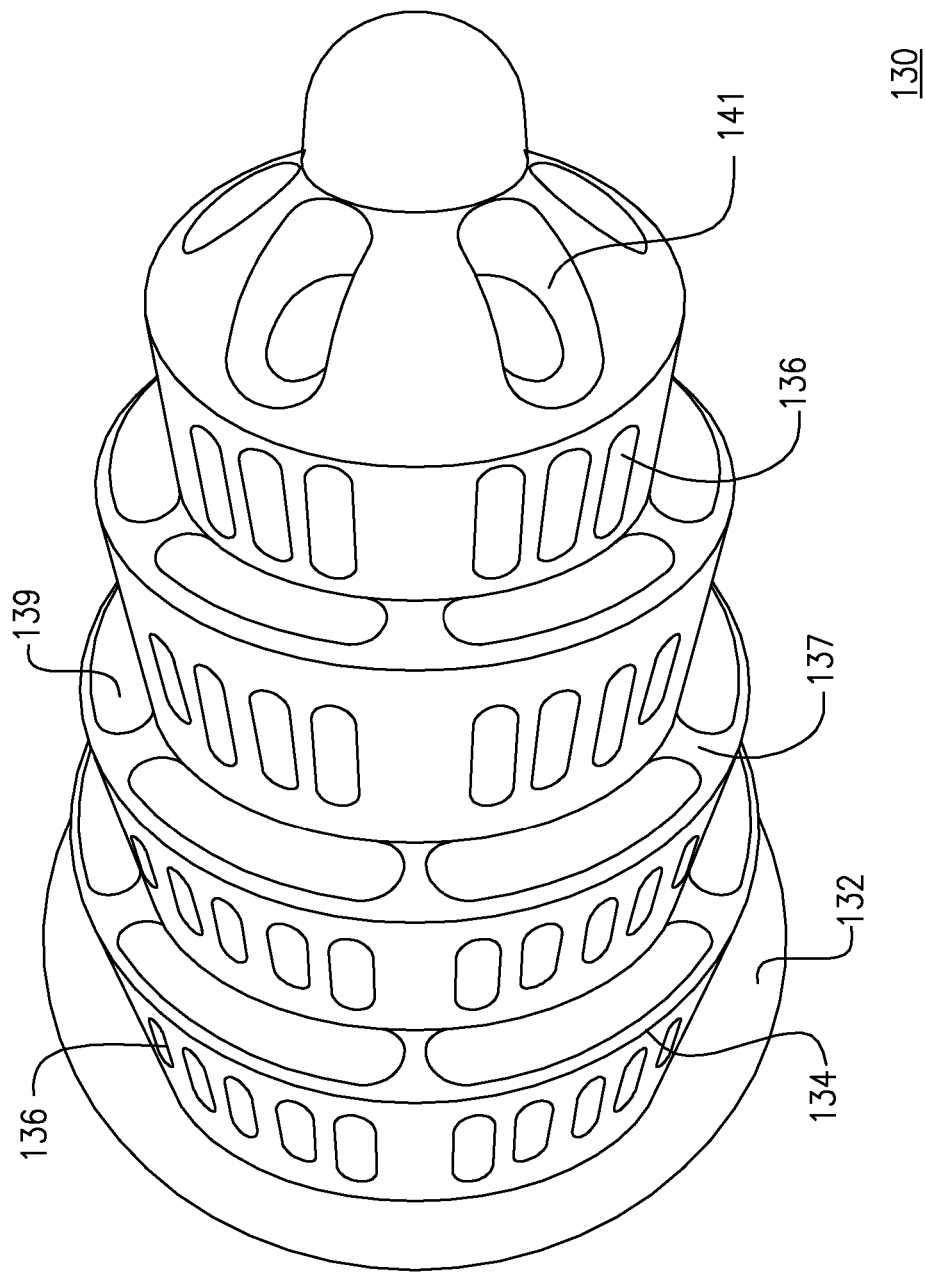
FIG. 10 is a perspective of a seventh embodiment of an air engine guard.

In still another variation, the guard 130 of FIG. 10 comprises a base 132, with three vertically oriented walls 134 with vertically oriented openings 134 distributed regularly around the periphery. As before, each vertical and peripheral wall has a diameter slightly smaller than the one below it, with tabs 137 joining and defining the arcuate air intakes, as shown. Behind the dome hat 142 is a first series of peripherally distributed, vertically oriented, curved rectangular intake openings 141, as shown.

Figure 11:
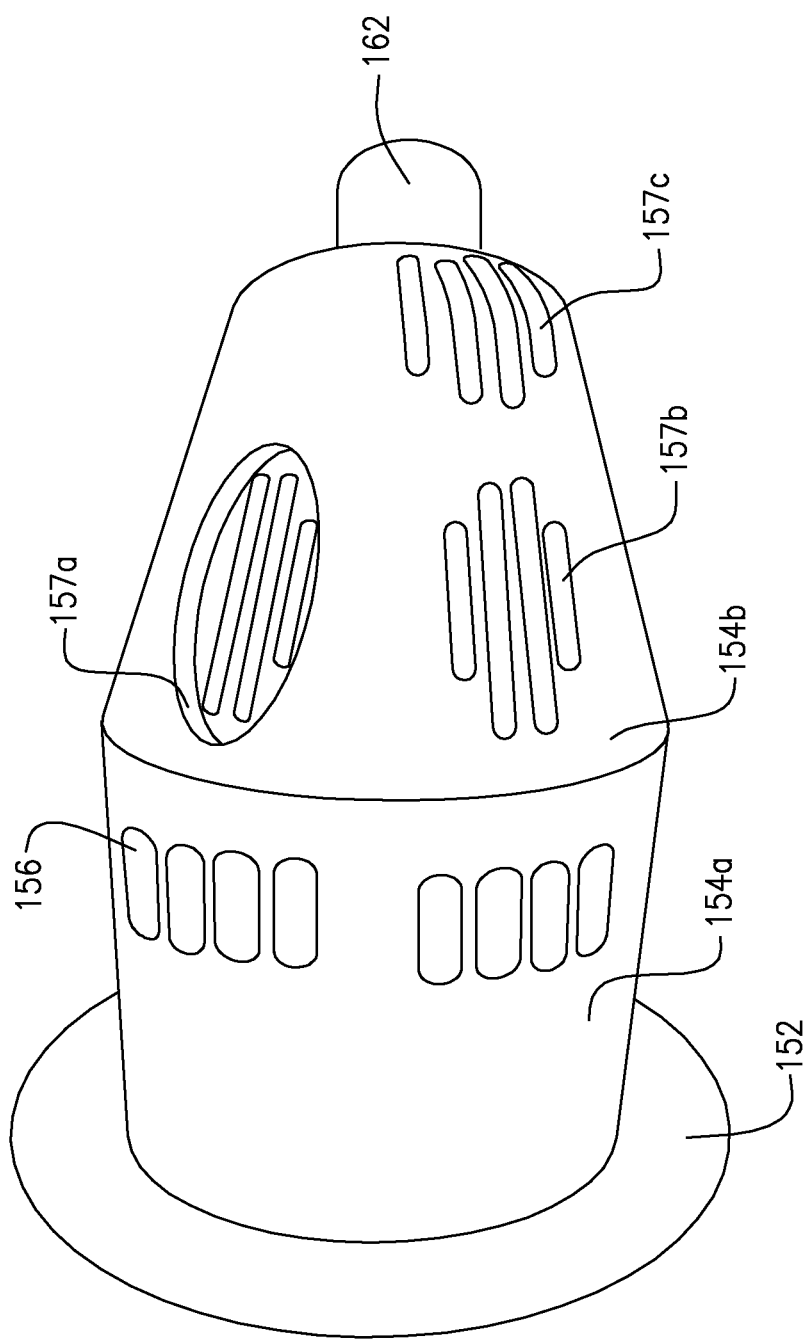
FIG. 11 is a perspective of an eighth embodiment of an air engine guard.

In still another variation of the guards of the present invention, the guard 150 of FIG. 11 has a base 152, a first vertically oriented wall 154a, comprising a plurality of rectangular and vertically oriented openings 156 around the periphery and an outsized dome portion 154b that has a gradually decreasing diameter peripheral wall and comprises vertically oriented slots of different sizes in several sections around the periphery and forward of those additional holes 157c which reach to the dome hat 162. The openings 157b may be located in an undercut section 157a. Also illustrated in FIG. 11, is a detritus door formed in the guard which is installed in an opening 1190 which also extends partially through the flange 152. The detritus door comprises a vertical wall section 1193, and a horizontal wall section 1192, where the door is hinged at 1194 and can be opened by opening screws 1191 to reach within and to remove, from time to time, any collected detritus or foreign objects that have been sucked into guard through normal operation or through encounters with foreign objects in the air.

Figure 12:
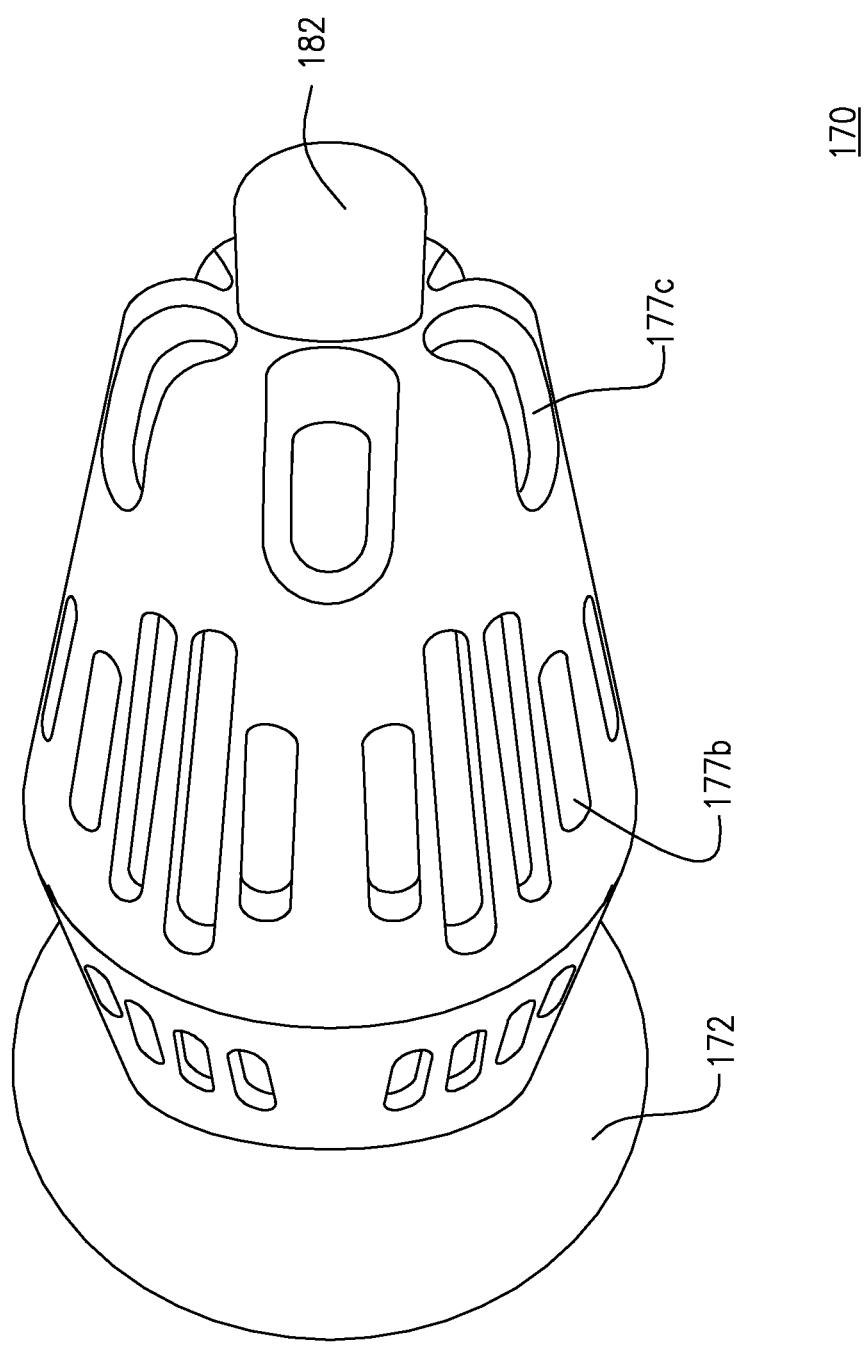
FIG. 12 is a perspective of a ninth embodiment of an air engine guard.

The further embodiment of FIG. 12 features a guard 170 that comprises a vertical wall at the base with a surrounding series of side-facing air intakes and a very enlarged dome section that has vertically oriented holes of different sizes around the periphery and forward thereof arcuate, vertically oriented and inwardly bending slots 177c, as shown.

In general, from the functionality perspective, the various embodiments perform the same function of preventing birds being ingested whole into the engine and permitting only those bird sections that break apart on impact to be ingested in small pieces, in a manner that can be handled by the aircraft engine, as mentioned. A common denominator of the various embodiments is that they all have acceptable aerodynamic surfaces, are extremely strong in construction and have aesthetically pleasing appearances. At the base, these domes match the opening size of an engine which could be larger than the height of a person, depending on the type of engine and aircraft. The general dome shape of the guards, their forwardly decreasing wall diameter sections, and where applicable, curved surfaces help deflect bird bodies sideways away from the engine intake and the guard's air openings.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An aircraft engine guard, for protecting an aircraft engine having an intake side against ingestion of large objects, the guard comprising:
    a generally cone-shaped body having a rear end and a front end and a central axis, comprising:
        a base section located at the rear end of the cone-shaped body comprising a flange sized to fit inside the intake of the aircraft engine, the flange having a plurality of openings for attaching the guard to the intake of the aircraft engine via a plurality of fasteners passing through the openings in the flange;
        a dome section having a plurality of forward facing intake openings, located at a forward end of the cone-shaped body;
        an outer wall located between the base and the dome section, comprising at least two vertical peripheral walls parallel to the central axis of the cone-shaped body, forming cylinders having successively smaller diameters decreasing from the base section toward the dome section;
        a plurality of tabs, generally perpendicular to the central axis of the cone-shaped body, connecting each of the at least two vertical peripheral walls to an adjacent vertical peripheral wall or to the dome section; and
        a plurality of air intake openings at least partially defined between said tabs, the plurality of air intake openings including arcuate openings between at least two of the vertical peripheral walls.

2. The guard of claim 1, wherein plurality of forward facing air intake openings include openings that extend continuously over two adjacent peripheral walls.

3. The guard of claim 1, wherein plurality of forward facing air intake openings include vertically orientated openings that are located in a plane that curves forwardly.

4. The guard of claim 1, further comprising a dome hat located at a leading end of the dome section.

5. The guard of claim 1, where the peripheral walls have a thickness of at least one-half an inch of aluminum.

* * * * *